United States Patent
Behera et al.

(10) Patent No.: US 7,914,250 B2
(45) Date of Patent: Mar. 29, 2011

(54) METHOD AND SYSTEM FOR ESTIMATING LIFE OF A GEARBOX

(75) Inventors: Ajay Kumar Behera, Bangalore (IN); Soumen De, West Bengal (IN); Vinay Bhaskar Jammu, Bangalore (IN)

(73) Assignee: General Electric Company, Niskayuna, NY (US)

(*) Notice: Subject to any disclaimer, the term of this patent is extended or adjusted under 35 U.S.C. 154(b) by 787 days.

(21) Appl. No.: 11/608,272

(22) Filed: Dec. 8, 2006

(65) Prior Publication Data

US 2008/0140349 A1 Jun. 12, 2008

(51) Int. Cl.
*F01D 15/12* (2006.01)

(52) U.S. Cl. .......... 415/1; 415/118; 415/122.1

(58) Field of Classification Search ........ 290/44, 290/55; 415/118, 122.1, 124.1, 232, 1; 416/61; 702/33, 34, 182
See application file for complete search history.

(56) References Cited

U.S. PATENT DOCUMENTS

| | | | | |
|---|---|---|---|---|
| 5,210,704 | A * | 5/1993 | Husseiny | 702/34 |
| 6,243,628 | B1 * | 6/2001 | Bliley et al. | 701/29 |
| 6,405,108 | B1 * | 6/2002 | Patel et al. | 701/29 |
| 6,526,356 | B1 * | 2/2003 | DiMaggio et al. | 702/35 |
| 6,567,752 | B2 * | 5/2003 | Cusumano et al. | 702/34 |
| 6,619,918 | B1 * | 9/2003 | Rebsdorf | 416/1 |
| 6,845,306 | B2 * | 1/2005 | Henry et al. | 701/29 |
| 7,004,724 | B2 * | 2/2006 | Pierce et al. | 416/61 |
| 7,039,557 | B2 * | 5/2006 | Mayer et al. | 702/184 |
| 7,206,719 | B2 * | 4/2007 | Lindsay et al. | 702/177 |
| 7,318,007 | B2 * | 1/2008 | Barkhoudarian | 702/184 |
| 2005/0049835 | A1 | 3/2005 | Mayer et al. | |
| 2005/0149290 | A1 | 7/2005 | Barkhoudarian | |
| 2005/0246150 | A1 * | 11/2005 | Shiromaru et al. | 703/7 |

FOREIGN PATENT DOCUMENTS

| | | |
|---|---|---|
| DE | 19713583 | 10/1998 |
| DE | 10315630 | 10/2004 |
| DE | 10353647 | 10/2004 |
| EP | 1531376 A1 | 5/2005 |
| EP | 1666723 | 6/2006 |
| WO | 9905414 | 2/1999 |
| WO | 0218879 | 3/2002 |

OTHER PUBLICATIONS

EP Search Report, EP07121710, May 29, 2008.
196212-1 Office Action, Application No. 07121710.3, Aug. 10, 2009.
WO3305414 Abstract, Feb. 4, 1999.

* cited by examiner

*Primary Examiner* — Ninh H Nguyen
*Assistant Examiner* — Sean J Younger
(74) *Attorney, Agent, or Firm* — Ann M. Agosti

(57) ABSTRACT

A gearbox life estimation system includes a single sensor or multiple sensors configured for obtaining field operational data related to loading of a gearbox from a single gearbox component or different gearbox components. The system further includes a processor configured for receiving signals representative of the field operational data from the sensors, for providing calculated operational load data for the gearbox components based on the field operational data, and for providing an estimate of remaining life of gearbox using the calculated operational load data.

13 Claims, 4 Drawing Sheets

METHOD AND SYSTEM FOR ESTIMATING LIFE OF A GEARBOX

BACKGROUND

The subject matter disclosed herein relates generally to gearboxes and more particularly to a method and system for estimating remaining life of a gearbox.

Gearboxes are used for power transmission in many systems such as, wind turbines, automobiles, and locomotives. A gearbox typically includes components such as a housing, shafts, bearings, and gears. Various gearbox designs are available to meet different speed transmission requirements. Two examples include a planetary gearbox and a helical gearbox.

Gears, bearings, and shafts in a gearbox may have defects, may fail over time, or may simply wear out. These damaged or worn components may be replaced after the damaged or worn condition is detected. However, taking a gearbox out of service for such replacement typically results in revenue loss. Instead, if the replacement is performed during a scheduled maintenance procedure, less loss occurs. Thus, knowledge of health of the key components of the gearbox can be used to enable effective maintenance. One of the parameters used in ascertaining the health of the gearbox is residual useful life (RUL), which is a function of the design of the gearbox, the components of the gearbox, and also the stress (number of cycles and number of peaks) the components experience during their operation. Any failure of individual components affects the RUL of the gearbox.

The design life of a gearbox typically is more than twenty years. However, several wind turbine gearboxes fail within four to five years. Conventional life calculation procedures are based on assumed operating profiles of the wind turbine. However in real operation, there could be significant variation in the operation profiles that could lead to gearbox life very different from that estimated during design. For example if there is unbalance in the rotor it creates an excess load on the bearing while in operation and that result into failure of bearing and hence the gearbox before its design life.

BRIEF DESCRIPTION

There is a need for a system and method to more accurately estimate remaining life of the gearbox. In one example, the life estimation is improved by applying component life estimation to the overall life estimation of the gearbox.

In one embodiment, a gearbox life estimation system includes at least one sensor configured for obtaining field operational data related to loading of a gearbox from gearbox component(s). The system further includes a processor configured for receiving signals representative of the field operational data from the sensor, for providing calculated operational load data for the gearbox component(s) based on the field operational data, and for estimating life of gearbox.

In another embodiment, a method for estimating remaining life of a gearbox includes receiving signals representative of field operational data related to gearbox loading; obtaining calculated operational load data for the gearbox components based on the field operational data; and providing an estimate of remaining life of the gearbox using a combination of design data and the calculated operational load data.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments described herein are useful for identifying failure modes of the critical components of a gearbox and using the identified information to predict the residual useful life (RUL) or the time to failure (TTF) of the overall gearbox while the machine is in operation that is in real time. "Real time" as defined herein is a time period that can range from seconds to any higher time period.

Figure 1:
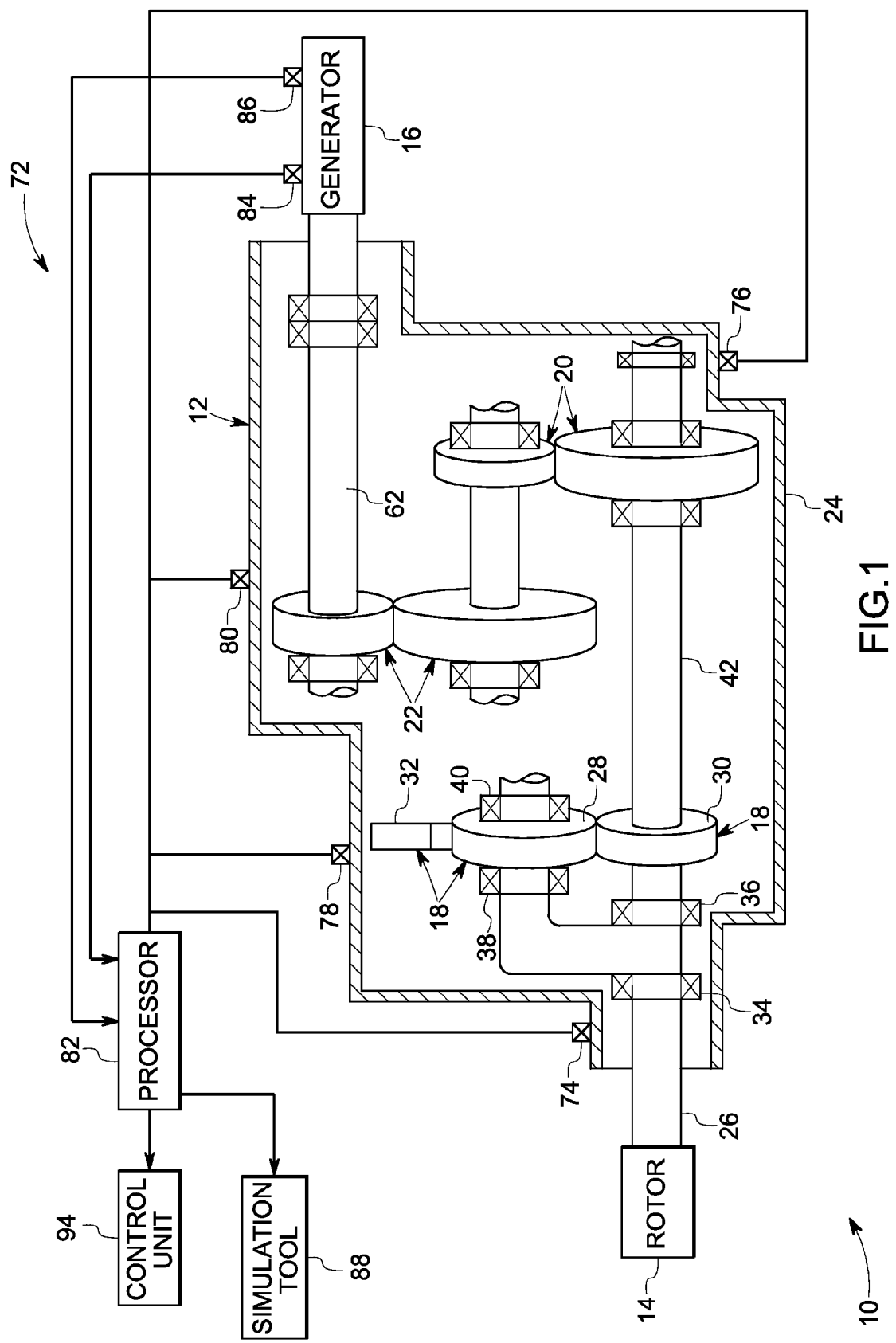
FIG. 1 is a block diagram illustrating a gearbox life estimation system in accordance with one embodiment.

Referring generally to FIG. 1, a rotating electric machine is illustrated, and represented generally by reference numeral 10. In the non-limiting embodiment of FIG. 1, for purposes of example, the rotating electric machine is a wind turbine. The wind turbine 10 has a gearbox 12 provided between a wind receiving rotor 14 and a generator 16. Wind receiving rotor 14 has a plurality of rotor blades (not shown). As the wind blows, wind receiving rotor 14 is rotated due to the force of the wind, and the rotation of the rotor 14 is transmitted via the gearbox 12 to generator 16 which in turn includes a generator rotor (not shown). The generator rotor is typically designed to operate at a greater speed than wind receiving rotor 14, so gearbox 12 is designed to increase the speed of rotation produced by wind receiving rotor 14 to the more desirable speed for driving the rotor of generator 16.

In the illustrated embodiment, gearbox 12 comprises a planetary gear set 18, an intermediate gear set 20, and a high-speed gear set 22 provided inside a gearbox casing 24. Wind receiving rotor 14 is coupled via a rotor shaft 26 to planetary gear set 18. Planetary gear set 18 comprises a planetary gear 28, a sun gear 30, and a ring gear 32 and is supported by a plurality of bearings 34, 36, 38, and 40. Sun gear 30 is coupled via a first gear shaft 42 to intermediate gear set 20. In one embodiment, sun gear 30 is smaller than planetary gear 28 and rotates (along with gear shaft 42) at a greater speed than rotor shaft 26. The intermediate gear set 20 and the high-speed gear set 22 similarly include gears, gear shafts, and bearings. The generator 16 converts the rotational energy of an output (main) shaft 62 into electricity.

A gearbox life estimation system 72 is provided to detect gear and bearing problems. In one embodiment, gearbox life estimation system 72 comprises sensors 74, 76, 78, and 80, as illustrated in FIG. 1. Though more than one sensors are shown in the illustrated embodiment, it may be noted that a single sensor may also be used in certain embodiments. The sensors are configured for obtaining field operational data related to loading of the gearbox 12 due to operational conditions. In a specific embodiment a speed signal and a vibration signal is used as field operational data. In yet another specific example the steady state speed information known apriori may be used and the sensor may provide only vibration signal.

The field operational data may include, for example, data regarding crow bar operations, number of start-ups, wind gusts, load sequences, low voltage ride through events, grid mismatches, trips, oil quality, and component level faults. The sensors obtain the aforementioned field operational data in the form of signals representative of vibration, wind velocity, speed, power, and other attributes relating to the functioning of gearbox components. In a specific example, a speed sensor 84 is configured to detect the speed of the output shaft 62, and a power sensor 86 is configured to detect the output power of the generator 16. A processor 82 is coupled to the sensors and is configured to receive the signals from the sensors. Furthermore, the processor 82 is operable to determine the location of a problem within the gearbox, whether it is in the planetary gear set 18, the intermediate gear set 20, the high-speed gear set 22, or the bearings. The processor 82 comprises hardware circuitry and software that enables the processor 82 to process the signals and thereby determine the condition or health of the gearbox 12. As appreciated by those skilled in the art, the processor 82 may include a range of circuitry types, such as a microprocessor, a programmable logic controller, or a logic module. The processor is described in more detail in reference to FIG. 2 and FIG. 3.

The gearbox life estimation system 72 may further include or be coupled to a simulation tool 88 configured to calculate load at turbine shaft 26. The gearbox life estimation system 72 may further include a control system or control unit 94. The sensors, processor and the control system in one embodiment form a gearbox protection system. In a more specific embodiment, the control system is configured to shift the operating point in the power curve by controlling pitch angle of the turbine blades to mitigate load unbalances based on an output from the processor 82. The modified operating point in the power curve enables the generator to operate at below the rated power keeping in view the health of gearbox components in order to optimize the working of the generator based on life of the gearbox components.

Figure 2:
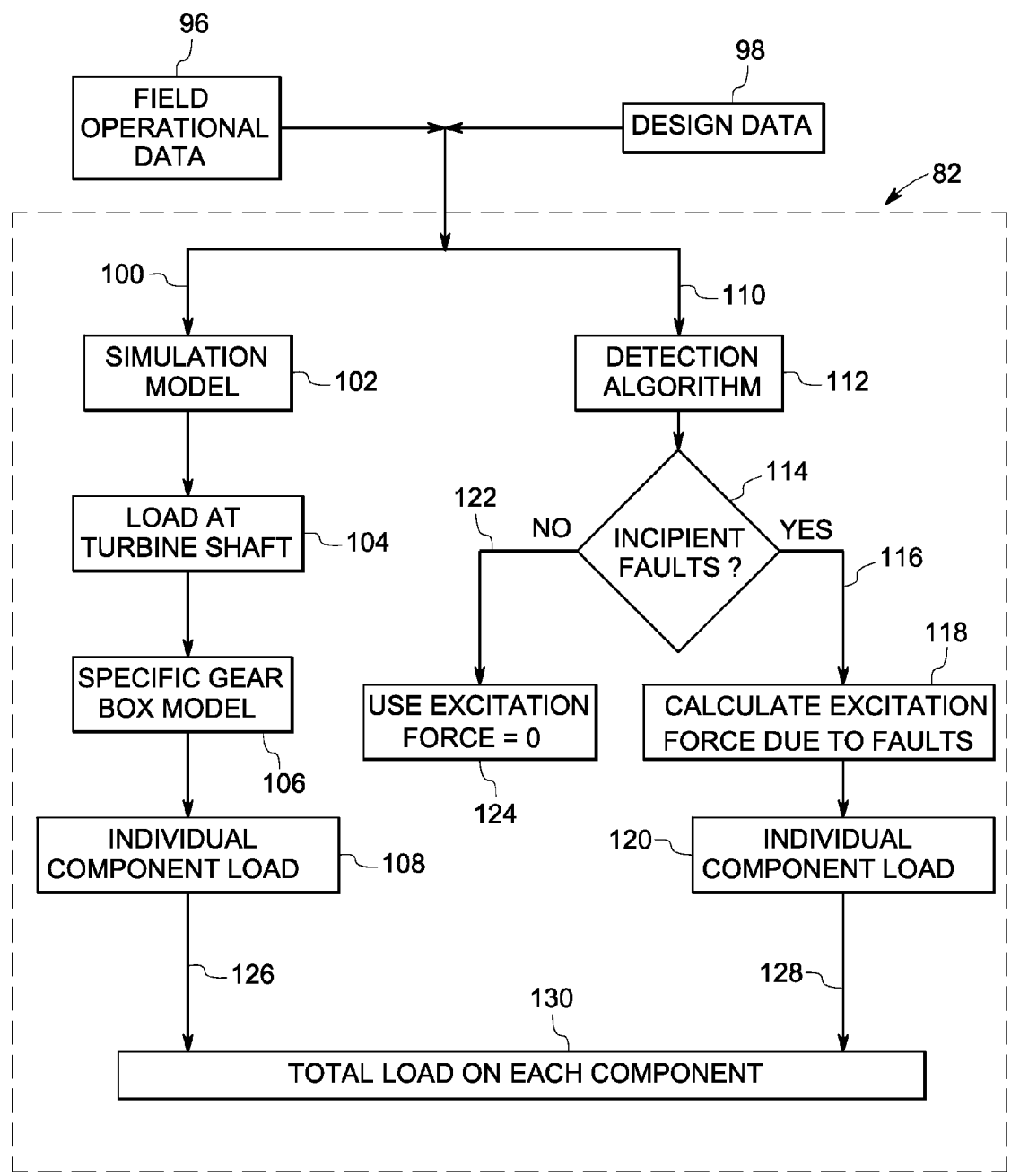
FIG. 2 is a block diagram illustrating a processor used in the system of FIG. 1 to calculate individual component loads.

As illustrated in FIG. 2, the processor 82 receives field operational data 96 (for example, speed, load, wind speed etc.) from the sensors and design data 98 (for example, gear details, bearing details etc.) is obtained by the manufacturers or equipment brochure. Within the processor 82, the field operational data 96 and the design data 98 are processed in two streams. In one stream, as indicated by arrow 100, the processor 82 is configured to use a generic wind simulation model 102 to generate load at the turbine shaft as shown by the block 104. The generic wind simulation model can be developed by using commercially available tools such as Flex 5, ANSYS, CFD (computational fluid dynamics) etc. The load at the turbine shaft is used in a specific gearbox model 106 to calculate the load at each component or individual component load, as shown by block 108. The specific gearbox model 106 is a FEM (Finite Element Analysis) model and is specific to the gearbox being deployed. Using the specific gearbox model 106, the processor 82 obtains calculated operational load data, and, based on calculated operational load data, the processor 82 calculates individual component load data 108 that is based on the field operational conditions.

The second stream as referred herein above is indicated by the arrow 110 in FIG. 2. The design data 98 and the field operational data 96 are sent to a detection algorithm (fault detection algorithm) as shown by block 112 to detect the presence of any incipient faults. Incipient faults, such as unbalance and bearing damage generate excess load on the bearings. The other incipient faults like tooth breakage cause excess load on individual teeth. This excess load contributes significantly towards premature failure of the gearbox components and hence the gearbox. Using vibration signature, other sensor data and applying detection algorithm, the incipient faults in a gearbox or gearbox components can be detected. Different faults that can be detected include gear failures, such as tooth breakage and cracks at a root of a gear tooth, and bearing failures such as ball damage and inner race spallation. Referring again to FIG. 2, at block 114, the detection algorithm checks the presence or absence of any incipient faults and any malfunctioning of the components of the gearbox. In the presence of incipient faults as shown by arrow 116, an excitation force due to the faults (that includes malfunctioning of any component) is calculated as shown by block 118. For example, due to any unbalance, the excitation force will be proportional to magnitude of the unbalance and square of the speed. Speed is obtained directly from the sensors and magnitude of unbalance can be obtained by analyzing vibration signatures. The excitation force, as mentioned before, appears in the system due to various incipient faults. Using the excitation force, load on an individual component is calculated as shown by block 120. If the detection algorithm detects no faults as indicated by the arrow 122, the excitation force is taken as zero as indicated by the block 124. The summation of outputs as indicated by arrows 126, and 128 gives the total load at each component as indicated by block 130. The total load at each component is used to estimate the remaining life of the individual components and the life of the gearbox. It may be noted, that the gearbox will fail at the earliest component failure.

Figure 3:
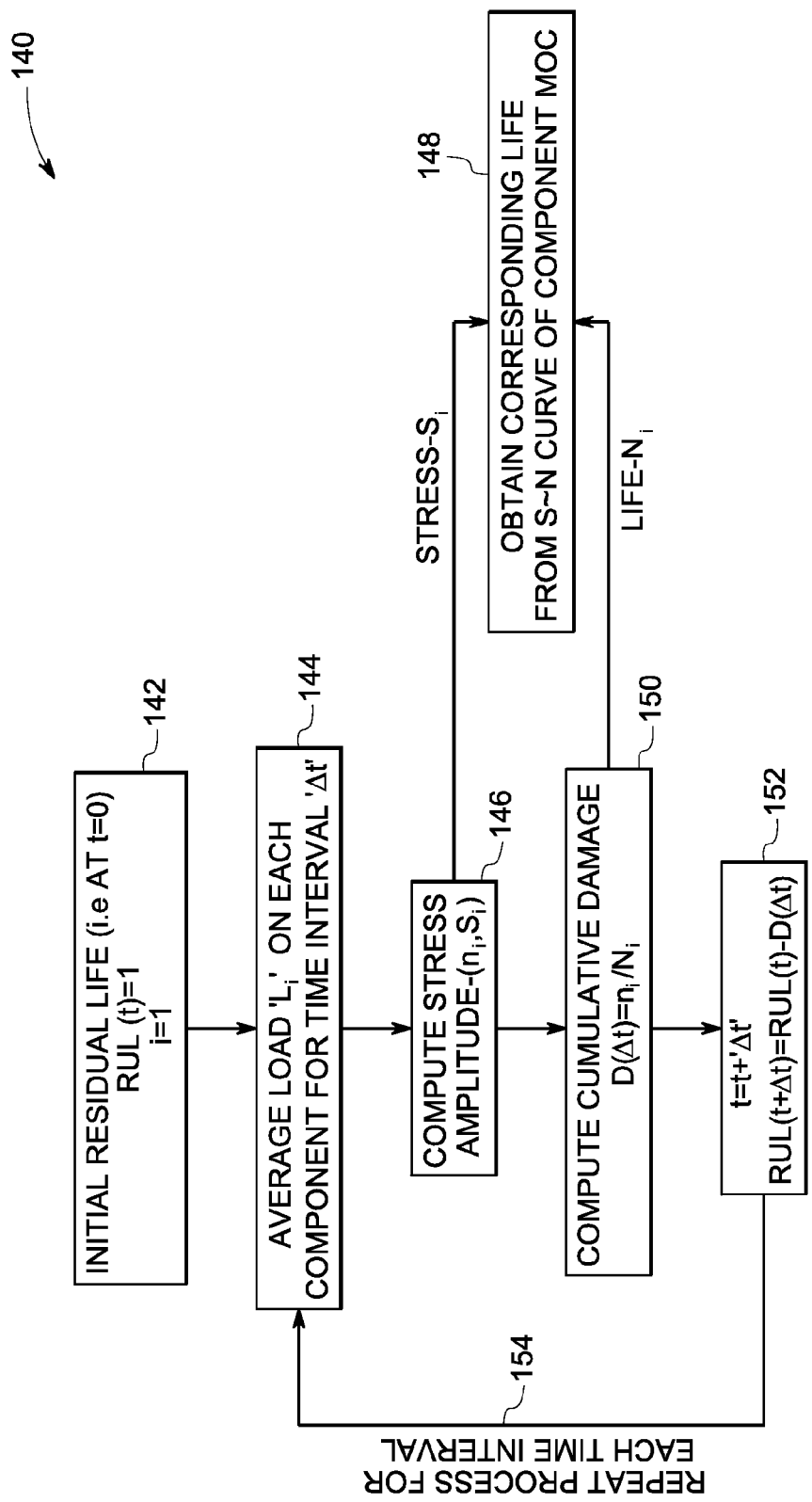
FIG. 3 is a flowchart illustrating one embodiment for estimating the residual life of a gearbox component.

FIG. 3 is a flowchart 140 illustrating a method for determining residual life of a gearbox component in real time. At step 142 initial residual life is obtained. For example, in an exemplary embodiment, assuming a new installation of the machinery and the components, at time t=0, the residual life RUL (t) is the full life of the component as obtained by design. Therefore RUL (t) at this instant of time is denoted as 1. For each time interval $\Delta t$, as shown by step 144, component load may be calculated using the technique described with reference to FIG. 2. $L_i$ represents the average load for the interval $\Delta t$ (for an iteration i). At step 146, a stress amplitude Si corresponding to average load $L_i$ is computed by knowing the design details (for example, geometry) of the gearbox. ni is the number of applied cycles of stress amplitude Si. At step 148, corresponding life Ni, that is the fatigue life corresponding for stress amplitude Si, is obtained from S-N curve of the component material. The S-N curves can be obtained from ASM (American Society of Metals) material handbook Vol-1 or can be obtained from experimental results for the specific material. The Ni value is used at step 150 to compute cumulative damage D ($\Delta t$) for the period "$\Delta t$" in the iteration i. The cumulative damage D ($\Delta t$) is obtained by ni/Ni (using Miner's rule). At step 152, the cumulative damage D ($\Delta t$) is subtracted from the RUL (t) value obtained at step 142 to give the new RUL value at time t+$\Delta t$. The loop as indicated by the feedback arrow 154 is used to calculate residual life of the component in a recursive manner.

In one example, using the above approach, load due to operating conditions and load due to excitation force occurring due to unbalance on a high speed shaft bearing is calculated. In a more specific example, the following load data given in Table 1 was obtained by using an analytical method. The results were taken at the operating conditions of 1.5 MW at 1440 RPM (rotations per minute). As expected the load due to the torque transmission remained same at 48.1 KN (Kilo Newtons), whereas the load due to unbalance (excitation forces) increased from 48.1 KN to 82.6 KN when the unbalance increased from 0 gm-mm (gram-millimeter) to 3031 gm-mm. The gearbox life estimation was reduced from 95419 hrs to 15829 hours (83% reduction in life).

TABLE 1

| 1X Response in gPK | Unbalance Mass (gm-mm) | RatingB (kN) | Peq (kN) | F0 (kN) | LoadE | L10 Life (hrs) |
|---|---|---|---|---|---|---|
| 0.00 | 0 | 720.0 | 48.1 | 0.0 | 48.1 | 95418.7 |
| 0.06 | 275 | 720.0 | 48.1 | 3.1 | 51.2 | 77718.1 |
| 0.12 | 550 | 720.0 | 48.1 | 6.3 | 54.4 | 63796.5 |
| 0.17 | 826 | 720.0 | 48.1 | 9.4 | 57.5 | 52892.4 |
| 0.23 | 1102 | 720.0 | 48.1 | 12.5 | 60.6 | 44322.4 |
| 0.29 | 1377 | 720.0 | 48.1 | 15.7 | 63.8 | 37467.0 |
| 0.35 | 1653 | 720.0 | 48.1 | 18.8 | 66.9 | 31928.4 |
| 0.41 | 1929 | 720.0 | 48.1 | 21.9 | 70.0 | 27408.6 |
| 0.46 | 2204 | 720.0 | 48.1 | 25.1 | 73.2 | 23686.5 |
| 0.52 | 2480 | 720.0 | 48.1 | 28.2 | 76.3 | 20595.5 |
| 0.58 | 2756 | 720.0 | 48.1 | 31.3 | 79.4 | 18009.1 |
| 0.64 | 3031 | 720.0 | 48.1 | 34.5 | 82.6 | 15829.4 |

Figure 4:
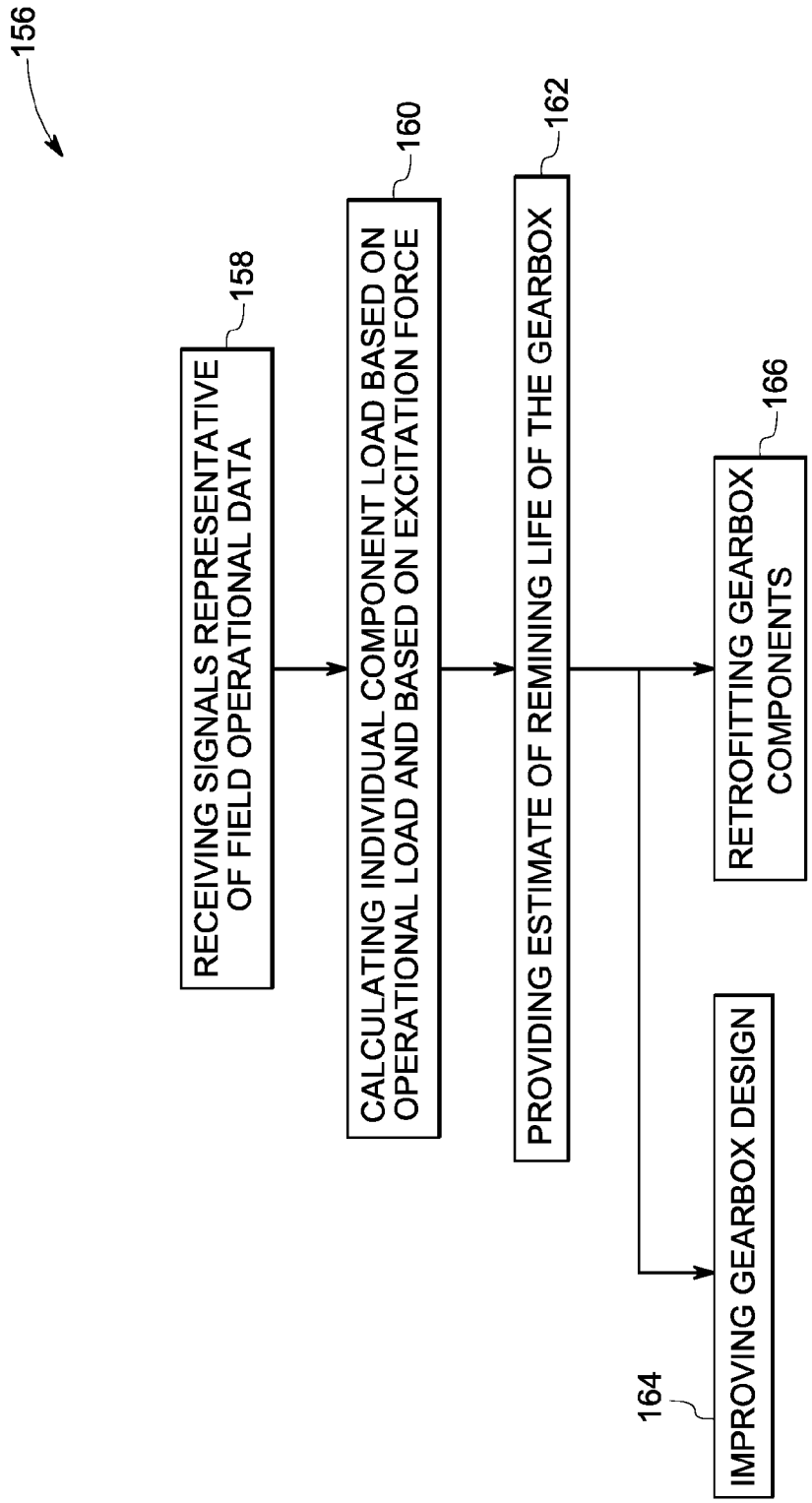
FIG. 4 is a flowchart illustrating exemplary steps for estimating remaining life of the gearbox of the system of FIG. 1.

FIG. 4 represents a flowchart 156 with exemplary steps for estimating remaining life of a gearbox to summarize the technique as described in reference to FIG. 2 and FIG. 3. The method includes a step 158 for receiving signals representative of field operational data related to gearbox loading. At step 160, the individual component load, based on operational conditions as well as based on excitation forces is calculated. At step 162, an estimate of remaining life of the gearbox is provided (for example the output of FIG. 2 or the output of FIG. 3). In one example, the estimate of remaining life is a real time estimate. At step 164, the estimated data is used to improve gearbox design using the information of the individual components load under actual operation. The method further includes a step 166 for scheduling of retrofitting the gearbox components based on the estimate of remaining life of gearbox.

The technique described herein provides for integrating the traditional residual life estimation methods with real time data. For example to estimate bearing life, the standard methods are used and additionally rotor unbalance loads from real time data are taken into consideration. Combining real time data is advantageous in comparison with the known estimation methods for loads and life in wind turbines, because the real time conditions contribute to the largest variation in the methods known in prior art. The technique described herein also provides the ability to develop better service contracts for the wind turbine or any other rotating machine. The accurate estimate of the gearbox life obtained as described above leads to savings and timely maintenance.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A gearbox life estimation system comprising:
at least one sensor for obtaining field operational data related to loading of a gearbox from a gearbox component; and
a processor configured for receiving signals representative of the field operational data from the at least one sensor, for providing calculated operational load data for estimating life of the gearbox, the processor further configured to compute an excitation force to obtain an individual component load due to operational conditions, wherein the field operational data represents operating parameters obtained while the gearbox is under operation.

2. The system of claim 1 wherein the gearbox component comprises at least one of a gearbox main shaft, bearing, or tooth.

3. The system of claim 1 wherein the field operational data comprises at least one of crow bar operations, number of start-ups, wind gusts, load sequences, low voltage ride throughs, grid mismatches, trips, oil quality, and component level faults.

4. The system of claim 1 wherein the processor is configured to obtain an individual component load due to excitation force, wherein the excitation force is calculated based on load unbalances due to faults.

5. The system of claim 4 wherein the processor is configured to calculate a total individual component load that is a summation of the individual component load due to excitation force and an individual component load due to operational conditions.

6. A gearbox life estimation system comprising:
at least one sensor configured for obtaining field operational data related to loading of a gearbox from gearbox components; and
a processor configured for receiving signals representative of the field operational data from the at least one sensor, and configured to provide an individual component load due to operational conditions for each of the gearbox components, the processor further configured to obtain an individual component load due to excitation force, wherein the excitation force is calculated based on load unbalances on the gearbox components due to faults.

7. The system of claim 6 wherein the processor is configured to calculate a total individual component load that is a summation of the individual component load due to excitation force and the individual component load due to operational conditions.

8. A method for estimating remaining life of a gearbox, the method comprising:
receiving signals representative of field operational data related to gearbox loading;
obtaining calculated operational load data for gearbox components based on the field operational data;
computing an individual component load due to operational conditions from excitation force generated due to faults; and
providing an estimate of remaining life of the gearbox using a combination of design data and the calculated operational load data.

9. The method of claim 8 wherein the providing the estimate of remaining life is performed in real time.

10. The method of claim 8 further comprising calculating excitation force due to load unbalance on the gearbox.

11. The method of claim 10 further comprising calculating an individual component load due to the excitation force.

12. The method of claim 11 further comprising calculating a total individual component load that is a summation of the individual component due to operational conditions and the individual component load due to the excitation force.

13. The method of claim 8 further comprising using the estimate of remaining life of the gearbox for predicting an incipient failure of the gearbox.

* * * * *

UNITED STATES PATENT AND TRADEMARK OFFICE
CERTIFICATE OF CORRECTION

| | | |
|---|---|---|
| PATENT NO. | : 7,914,250 B2 | Page 1 of 1 |
| APPLICATION NO. | : 11/608272 | |
| DATED | : March 29, 2011 | |
| INVENTOR(S) | : Behera et al. | |

It is certified that error appears in the above-identified patent and that said Letters Patent is hereby corrected as shown below:

On the Face Page, in the Figure, for Block "162", in Line 1, delete "REMINING" and insert -- REMAINING --, therefor.

In Fig. 4, Sheet 4 of 4, for Block "162", in Line 1, delete "REMINING" and insert -- REMAINING --, therefor.

Signed and Sealed this
Nineteenth Day of July, 2011

David J. Kappos
*Director of the United States Patent and Trademark Office*